United States Patent
Takizawa

(10) Patent No.: US 11,467,243 B2
(45) Date of Patent: Oct. 11, 2022

(54) RADIO WAVE ARRIVAL DIRECTION ESTIMATION APPARATUS

(71) Applicant: Murata Manufacturing Co., Ltd., Kyoto (JP)

(72) Inventor: Koichi Takizawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/165,083

(22) Filed: Feb. 2, 2021

(65) Prior Publication Data

US 2021/0156947 A1    May 27, 2021

Related U.S. Application Data

(63) Continuation of application No. PCT/JP2019/028867, filed on Jul. 23, 2019.

(30) Foreign Application Priority Data

Aug. 3, 2018  (JP) .............................. JP2018-146495

(51) Int. Cl.
   *G01S 3/74*  (2006.01)
   *G01S 3/04*  (2006.01)
   *G01S 3/72*  (2006.01)

(52) U.S. Cl.
   CPC ............... *G01S 3/74* (2013.01); *G01S 3/043* (2013.01); *G01S 3/72* (2013.01)

(58) Field of Classification Search
   CPC ............... G01S 3/74; G01S 3/043; G01S 3/72

USPC .......................... 342/417, 357.71, 457, 465
See application file for complete search history.

(56) References Cited

U.S. PATENT DOCUMENTS

2015/0304979 A1* 10/2015 Kumar .................. G01S 5/0273
                                                       455/456.1
2018/0038935 A1*  2/2018 Iizuka ....................... G01S 5/06

FOREIGN PATENT DOCUMENTS

| JP | 2009-14688 A   | 1/2009  |
| JP | 2016-194454 A  | 11/2016 |
| WO | 2011/123065 A1 | 10/2011 |

OTHER PUBLICATIONS

International Search Report for PCT/JP2019/028867 dated Oct. 21, 2019.
Written Opinion for PCT/JP2019/028867 dated Oct. 21, 2019.

* cited by examiner

*Primary Examiner* — Bo Fan
(74) *Attorney, Agent, or Firm* — Pearne & Gordon LLP

(57) ABSTRACT

Two antennas receive three kinds of radio waves with different frequencies. A computation unit determines the arrival direction of the three kinds of radio waves arriving at the two antennas after propagating along two mutually different paths from a single transmit point in accordance with receive signals of the three kinds of radio waves with different frequencies received individually by the two antennas.

12 Claims, 6 Drawing Sheets

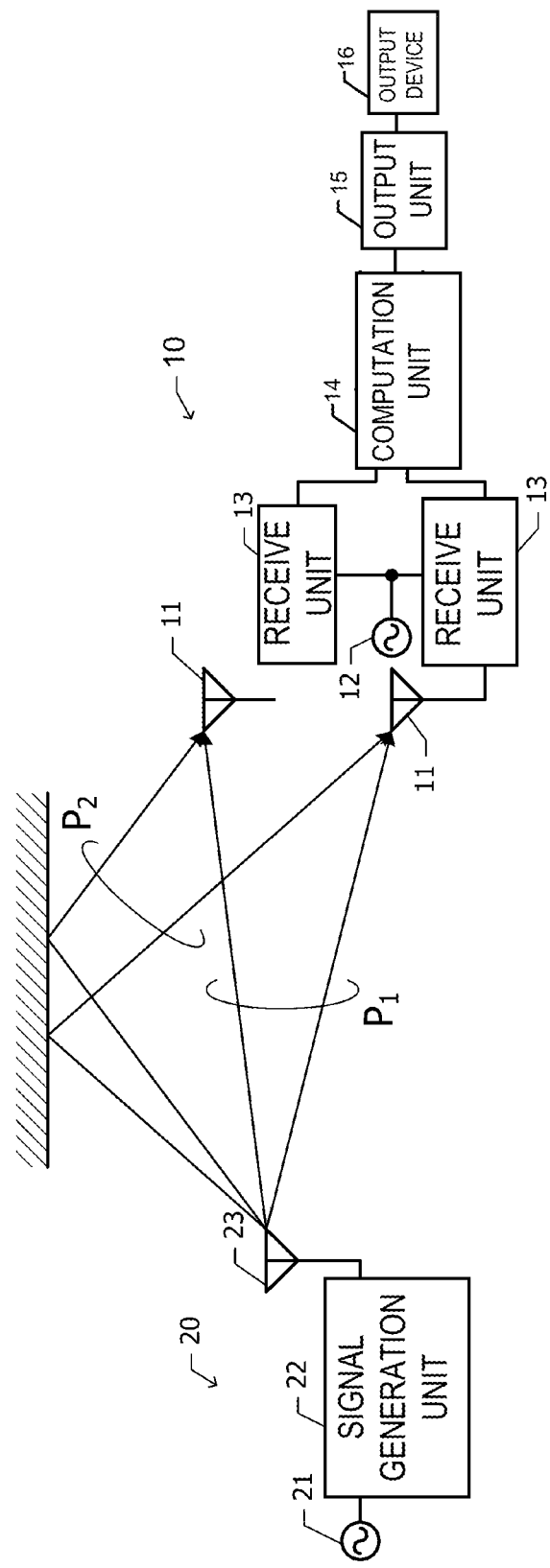

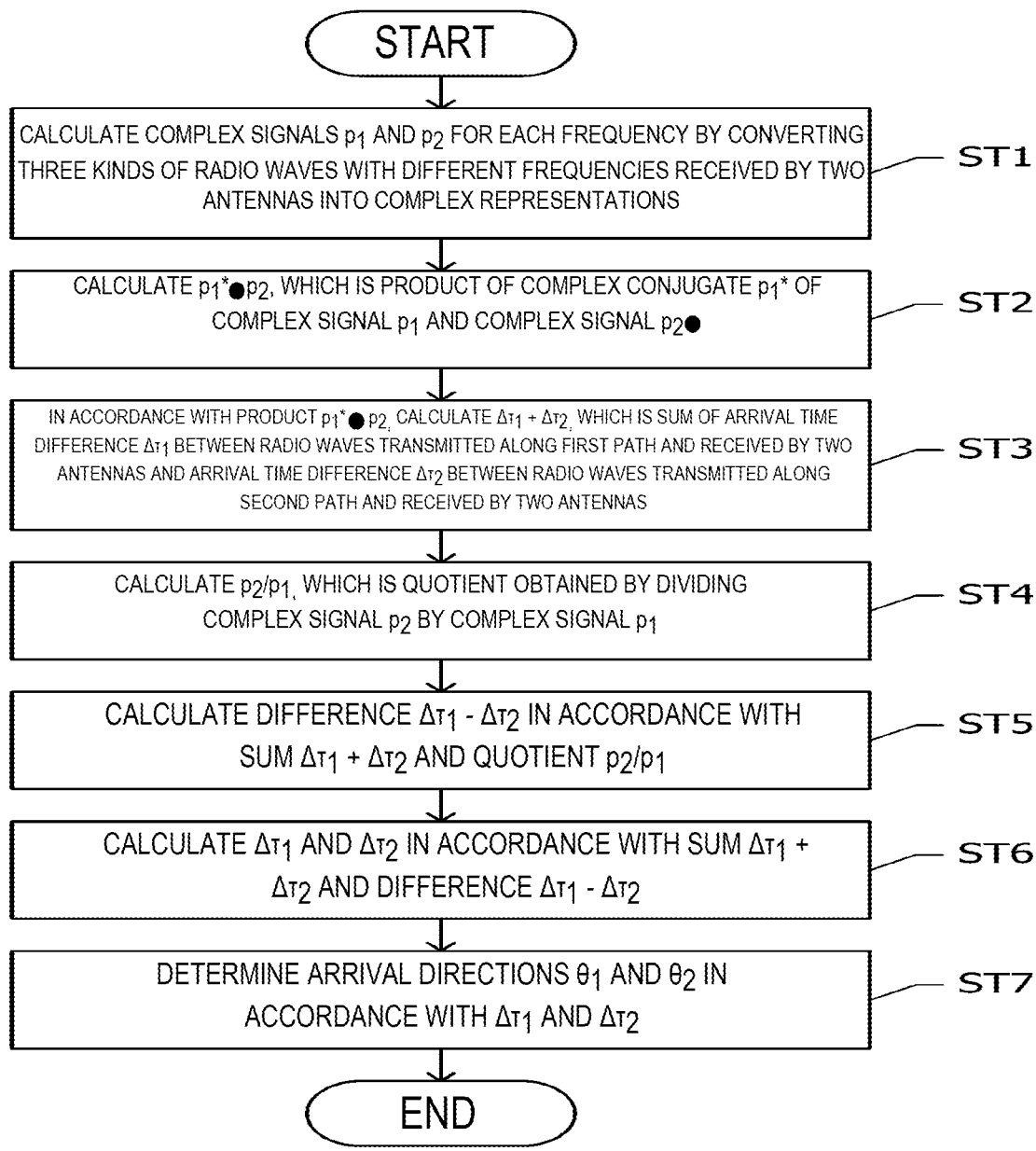

| | $\Delta\tau_1$ [ps] | $\Delta\tau_2$ [ps] | $\theta_1$ [°] | $\theta_2$ [°] |
|---|---|---|---|---|
| TRUE VALUE | 0 | -256 | 0 | -45.0 |
| SIMULATION VALUE | -1 | -236 | -0.2 | -43.2 |

RADIO WAVE ARRIVAL DIRECTION ESTIMATION APPARATUS

CROSS REFERENCE TO RELATED APPLICATIONS

This is a continuation of International Application No. PCT/JP2019/028867 filed on Jul. 23, 2019 which claims priority from Japanese Patent Application No. 2018-146495 filed on Aug. 3, 2018. The contents of these applications are incorporated herein by reference in their entireties.

BACKGROUND

Technical Field

The present disclosure relates to a radio wave arrival direction estimation apparatus.

In a multipath environment, a known apparatus estimates a direction from which direct and reflected waves arrive (for example, Patent Document 1). The apparatus disclosed in Patent Document 1 estimates the arrival direction of radio wave by using the center of a rotation plate and two antennas disposed at positions different from the center. Additionally, as the method for estimating the arrival direction of direct wave and the arrival direction of reflected wave in a multipath environment, the multiple signal classification (MUSIC) method and the method of direction estimation (MODE) are known.

Patent Document 1: Japanese Unexamined Patent Application Publication No. 2009-14688

BRIEF SUMMARY

When the arrival direction of radio wave is estimated by employing the MUSIC or the MODE, antennas need to be greater in number than arriving waves. For example, in the case in which one direct wave and one main reflected wave arrive, three antennas need to be installed. When the apparatus disclosed in Patent Document 1 is used, the antennas do not need to be greater in number than arriving waves, but the rotation plate needs to be installed; thus, the components constituting the apparatus increases, resulting in increase in size.

The present disclosure provides a radio wave arrival direction estimation apparatus in which antennas do not need to be greater in number than arriving waves and no rotation plate is necessary.

An aspect of the present disclosure provides a radio wave arrival direction estimation apparatus including two antennas configured to receive three kinds of radio waves with different frequencies and a computation unit configured to determine the arrival direction of the three kinds of radio waves arriving at the two antennas after propagating along two mutually different paths from a single transmit point in accordance with receive signals of the three kinds of radio waves with different frequencies received individually by the two antennas.

By receiving three kinds of radio waves with different frequencies, the arrival direction of radio wave can be estimated with the use of two antennas without necessarily using any movable mechanical device, such as a rotation plate.

BRIEF DESCRIPTION OF THE SEVERAL VIEWS OF THE DRAWINGS

FIG. 1 is a schematic diagram of a radio communication system including a radio wave arrival direction estimation apparatus according to a first embodiment and a transmission device.

FIG. 2 is a flowchart of processing performed by a computation unit of the radio wave arrival direction estimation apparatus according to the first embodiment.

DETAILED DESCRIPTION

First Embodiment

Figure 3A:
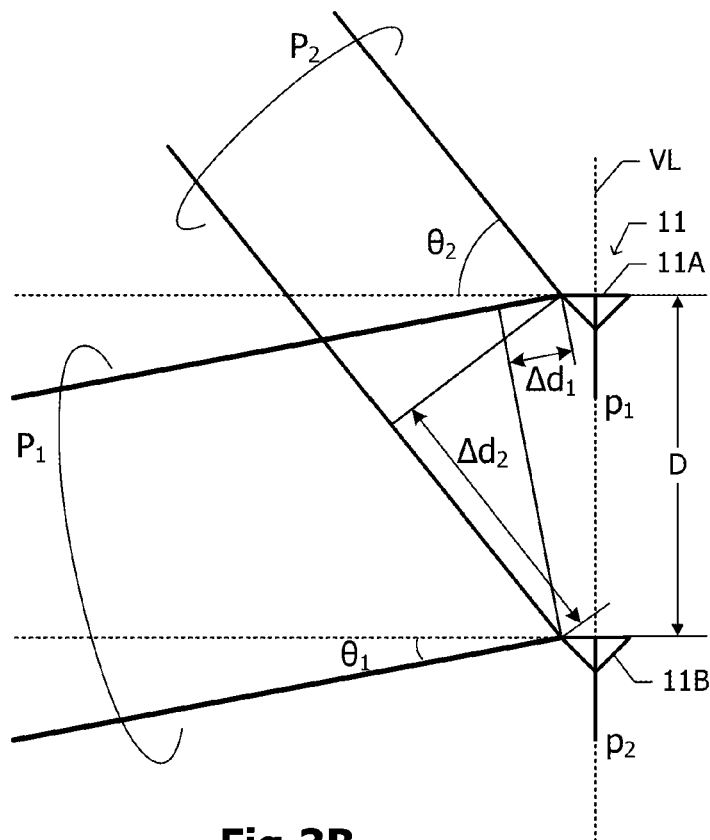
FIG. 3A illustrates a relationship between two antennas of the radio wave arrival direction estimation apparatus and the arrival direction of radio wave.

A radio wave arrival direction estimation apparatus according to a first embodiment will be described with reference to FIGS. 1 to 6. FIG. 1 is a schematic diagram of a wireless communication system including a radio wave arrival direction estimation apparatus 10 according to the first embodiment and a transmission device 20. The transmission device 20 includes a local oscillator 21, a signal generation unit 22, and an antenna 23. The local oscillator 21 outputs a local clock signal. The signal generation unit 22 outputs a particular transmit signal indicating a predetermined pattern sequentially at three different carrier frequencies. These transmit signals are emitted as radio waves by the antenna 23. As such, a single transmit point sequentially emits three kinds of radio waves with different frequencies.

In the first embodiment, as main propagation paths along which radio waves emitted by the transmission device 20 travel to the radio wave arrival direction estimation apparatus 10, two mutually different paths of a first path $P_1$ and a second path $P_2$ exist. The first path $P_1$ corresponds to, for example, a path along which a direct wave directly arrives at the radio wave arrival direction estimation apparatus 10 from the transmission device 20. The second path P2 corresponds to, for example, a path along which a reflected wave arrives at the radio wave arrival direction estimation apparatus 10 while the reflected wave is reflected by, for example, a building outdoors, or a wall or a floor indoors.

The radio wave arrival direction estimation apparatus 10 includes two antennas 11. The two antennas 11 are disposed at spatially different positions. The two antennas 11 have a function of receiving three kinds of radio waves with different frequencies emitted by the transmission device 20. Receive signals received by the two antennas 11 are inputted respectively to corresponding receive units 13. The two receive units 13 operate in accordance with a local clock provided by a local oscillator 12 and down-convert receive signals received by the antennas 11; in other words, the two receive units 13 both operates in accordance with synchronized local clock signals. For example, the receive unit 13 converts a receive signal into a complex signal (IQ signal) as a complex representation of the receive signal by comparing the receive signal with the local clock signal and outputs the complex signal. The complex signal contains amplitude information and phase information of the receive signal. The complex signal is outputted for each of the three kinds of radio waves with different frequencies.

The complex signals outputted by the two receive units 13 are inputted to a computation unit 14 (e.g., embodied as a processor). The computation unit 14 computes, in accordance with receive signals of the three kinds of radio waves with different frequencies, the arrival directions of radio waves having traveled along the first path $P_1$ and the second path $P_2$ and arrived at the two antennas 11. For example, the computation unit 14 computes the arrival direction of radio waves by performing arithmetic operation for the complex signals obtained by down-converting the receive signals received by the two antennas 11.

The information about the arrival direction of radio wave computed by the computation unit 14 is inputted to an output unit 15. The output unit 15 outputs the information about the arrival direction of radio wave to an output device 16. As the output device 16, for example, a printer, a display, or a communication device is used.

Next, processing of the computation unit 14 will be described with reference to FIGS. 2, 3A, and 3B. FIG. 2 is a flowchart of processing performed by the computation unit 14 (FIG. 1). FIG. 3A illustrates an example of a relationship between the two antennas 11 of the radio wave arrival direction estimation apparatus 10 and the arrival direction of radio wave. The two antennas 11 are spaced apart by a distance D from each other. One of the antennas 11 is referred to as a first antenna 11A while the other of the antennas 11 is referred to as a second antenna 11B. The arrival direction of radio wave is represented by an inclination angle with respect to an imaginary plane perpendicular to an imaginary straight line VL passing the two antennas 11. An inclination angle of the first path $P_1$ with respect to an imaginary plane as a reference is indicated by $\theta_1$. An inclination angle of the second path $P_2$ with respect to an imaginary plane as a reference is indicated by $\theta_2$. As for the first path $P_1$, the difference between a path length from the transmission device 20 (FIG. 1) to the first antenna 11A and a path length from the transmission device 20 to the second antenna 11B is indicated by $\Delta d_1$. Similarly, as for the second path $P_2$, the difference between a path length from the transmission device 20 (FIG. 1) to the first antenna 11A and a path length from the transmission device 20 to the second antenna 11B is indicated by $\Delta d_2$.

Firstly, in step ST1 in FIG. 2, three kinds of radio waves with different frequencies received by the first antenna 11A and the second antenna 11B are converted into complex representations, and as a result, complex signals $p_1$ and $p_2$ are computed for each frequency. Complex signals $S_{11}$ and $S_{12}$ computed by converting signals transmitted along the first path $P_1$ and the second path $P_2$ and received by the first antenna 11A into complex representations are given by the following expressions:

[Math. 1]

$$S_{11} = a_1 e^{-i\omega\tau_{11}} \quad (1)$$

[Math. 2]

$$S_{12} = a_2 e^{-i\omega\tau_{12}} \quad (2)$$

where $a_1$ is the amplitude of a signal transmitted along the first path $P_1$ and received by the first antenna 11A; $a_2$ is the amplitude of a signal transmitted along the second path $P_2$ and received by the first antenna 11A; $\omega$ is the angular frequency of radio wave; $\tau_{11}$ is a time corresponding to the phase of a receive signal transmitted along the first path $P_1$ with respect to the local clock signal; and $\tau_{12}$ is a time corresponding to the phase of a receive signal transmitted along the second path $P_2$ with respect to the local clock signal.

Similarly, complex signals $S_{21}$ and $S_{22}$ computed by converting signals transmitted along the first path $P_1$ and the second path $P_2$ and received by the second antenna 11B into complex representations are given by the following expressions:

[Math. 3]

$$S_{21} = a_1 e^{-i\omega\tau_{21}} \quad (3)$$

[Math. 4]

$$S_{22} = a_2 e^{-i\omega\tau_{22}} \quad (4)$$

where it is assumed that the amplitude of a signal transmitted along the first path $P_1$ and received by the second antenna 11B and the amplitude of a signal transmitted along the second path $P_2$ and received by the second antenna 11B are respectively identical to the amplitude of a signal transmitted along the first path $P_1$ and received by the first antenna 11A and the amplitude of a signal transmitted along the second path $P_2$ and received by the first antenna 11A; $\tau_{21}$ is a time corresponding to the phase lag of a receive signal transmitted along the first path $P_1$ with respect to the local clock signal; and $\tau_{22}$ is a time corresponding to the phase lag of a receive signal transmitted along the second path $P_2$ with respect to the local clock signal.

The complex signals $p_1$ and $p_2$ received by the first antenna 11A and the second antenna 11B are given by the following expressions.

[Math. 5]

$$p_1 = S_{11} + S_{12} = a_1 e^{-i\omega\tau_{11}} + a_2 e^{-i\omega\tau_{12}} \quad (5)$$

[Math. 6]

$$p_2 = S_{21} + S_{22} = a_1 e^{-i\omega\tau_{21}} + a_2 e^{-i\omega\tau_{22}} \quad (6)$$

Figure 3B:
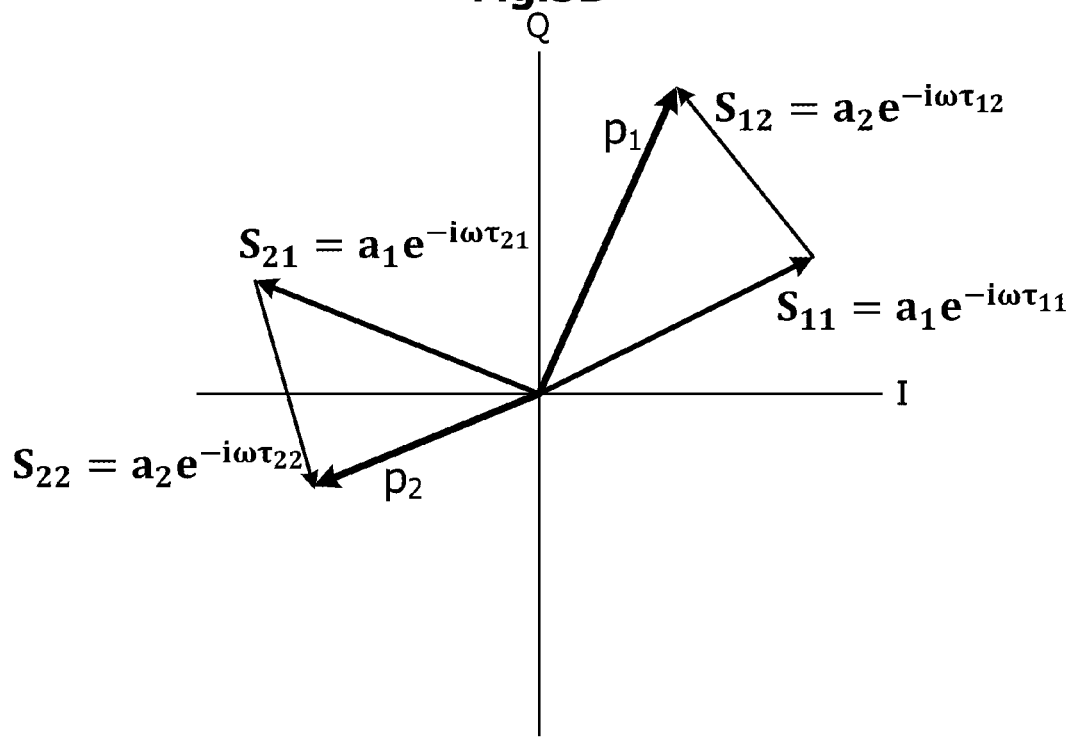
FIG. 3B is a graph in which complex signals $S_{11}$, $S_{12}$, $S_{21}$, $S_{22}$, $p_1$, and $p_2$ are illustrated on a complex plane.

FIG. 3B is a graph in which the complex signals $S_{11}$, $S_{12}$, $S_{21}$, $S_{22}$, $p_1$, and $p_2$ are illustrated on a complex plane. The amplitude and phase of the complex signals $p_1$ and $p_2$ can be calculated by down-converting corresponding receive signals received by the first antenna 11A and the second antenna 11B. The amplitude and phase of the complex signals $S_{11}$, $S_{12}$, $S_{21}$, and $S_{22}$ are unknown.

To express signals received by the first antenna 11A and the second antenna 11B by using parameters of arrival time difference (corresponding to phase difference), $\Delta\tau_1$, $\Delta\tau_2$, and $\Delta\tau_{12}$ are defined as follows.

[Math. 7]

$$\Delta\tau_1 = \tau_{21} - \tau_{11}$$

$$\Delta\tau_2 = \tau_{22} - \tau_{12}$$

$$\Delta\tau_{12} = \tau_{12} - \tau_{11} \quad (7)$$

$\Delta\tau_1$ is an arrival time difference between a radio wave transmitted to the first antenna 11A along the first path $P_1$ and a radio wave transmitted to the second antenna 11B along the first path $P_1$. $\Delta\tau_2$ is an arrival time difference between a radio wave transmitted to the first antenna 11A along the second path $P_2$ and a radio wave transmitted to the second antenna 11B along the second path $P_2$. $\Delta\tau_{12}$ is an arrival time difference between a radio wave transmitted to the first antenna 11A along the first path $P_1$ and a radio wave transmitted to the first antenna 11A along the second path P2.

Expression (7) can be modified as follows.

[Math. 8]

$$\tau_{22}-\tau_{11}=\Delta\tau_2+\Delta\tau_{12}$$
$$\tau_{21}-\tau_{12}=\Delta\tau_1-\Delta\tau_{12} \quad (8)$$

Next, in step ST2 in FIG. 3, the product of a complex conjugate $p_1^*$ of the complex signal $p_1$ and a complex signal $p_2$, which is $p_1^* \cdot p_2$, is calculated. The product $p_1^* \cdot p_2$ can be modified as follows.

[Math. 9]

$$p_1^* \cdot p_2 = e^{-i\omega\frac{\Delta\tau_1+\Delta\tau_2}{2}}(A_1 + A_2 + A_3) \quad (9)$$

$A_1$, $A_2$, and $A_3$ are given by the following expressions.

[Math. 10]

$$A_1 = a_1^2 e^{-i\omega\frac{\Delta\tau_1-\Delta\tau_2}{2}}$$

$$A_2 = a_2^2 e^{i\omega\frac{\Delta\tau_1-\Delta\tau_2}{2}}$$

$$A_3 = 2a_1 a_2 \cos\left(\omega\left(\frac{-\Delta\tau_1+\Delta\tau_2}{2}+\Delta\tau_{12}\right)\right) \quad (10)$$

Next, in step ST3 in FIG. 2, $\Delta\tau_1+\Delta\tau_2$ is calculated in accordance with the product $p_1^* \cdot p_2$. Hereinafter, the method of calculating $\Delta\tau_1+\Delta\tau_2$ will be described.

The difference between the path length from the transmission device 20 (FIG. 1) to the first antenna 11A in the first path $P_1$ and the path length from the transmission device 20 to the second antenna 11B in the first path $P_1$ is significantly smaller than the difference of path length between the first path $P_1$ and the second path $P_2$. Similarly, the difference between the path length from the transmission device 20 (FIG. 1) to the first antenna 11A in the second path $P_2$ and the path length from the transmission device 20 to the second antenna 11B in the second path $P_2$ is significantly smaller than the difference of path length between the first path $P_1$ and the second path $P_2$. As a result, the arrival time differences $\Delta\tau_1$ and $\Delta\tau_2$ are both significantly smaller than the arrival time difference $\Delta\tau_{12}$. When the difference of the angular frequency $\omega$ among the three kinds of radio waves with different frequencies is significantly small, for example, when the fractional bandwidth is significantly small, $\omega\Delta\tau_1$ and $\omega\Delta\tau_2$ can be both deemed as constants.

Under this assumption, it can be considered that, when the angular frequency $\omega$ is changed, only the term $A_3$ including $\Delta\tau_{12}$ is changed in Expression (9). The exponential function as the coefficient of A3 represents the amount of rotation of the locus of the product $p_1^* \cdot p_2$ on the complex plane with respect to the real axis (I axis). The locus of the product $p_1^* \cdot p_2$ is approximated by a straight line having an inclination corresponding to the amount of rotation. Since the exponential portion of the exponential function as the coefficient of $A_3$ of Expression (9) includes $\Delta\tau_1+\Delta\tau_2$, $\Delta\tau_1+\Delta\tau_2$ can be calculated in accordance with the inclination of the approximation straight line of the locus of the product $p_1^* \cdot p_2$. The average angular frequency $\omega$ among the three kinds of radio waves can be used when $\Delta\tau_1+\Delta\tau_2$ is calculated.

However, $\Delta\tau_1+\Delta\tau_2$ usually results in multiple solutions, and a unique solution cannot be determined. A single solution needs to satisfy the following condition:

[Math. 11]

$$|\Delta\tau_1 + \Delta\tau_2| < \frac{1}{2f} \quad (11)$$

where f is the highest frequency of the three kinds of radio waves received by the radio wave arrival direction estimation apparatus 10. The following expression is derived from Expression (11):

[Math. 12]

$$|\Delta d_1 + \Delta d_2| < \frac{\lambda}{2} \quad (12)$$

where $\Delta d_1$ and $\Delta d_2$ are each the difference of path length illustrated in FIG. 3A, and $\lambda$ is a shortest wave length of the three kinds of radio waves received by the radio wave arrival direction estimation apparatus 10.

According to Expression (12), by setting the distance D between the two antennas 11 to a distance shorter than $\lambda/4$, the solution of $\Delta\tau_1+\Delta\tau_2$, which is the sum of arrival time differences, can be uniquely determined.

Next, in step ST4 in FIG. 2, the quotient $p_2/p_1$ is obtained by dividing the complex signal $p_2$ by the complex signal $p_1$.

Subsequently, step ST5 in FIG. 2, an arrival time difference $\Delta\tau_1-\Delta\tau_2$ is determined in accordance with $\Delta\tau_1+\Delta\tau_2$ determined in step ST3 and the quotient $p_2/p_1$ determined in step ST4. Hereinafter, a method of determining the arrival time difference $\Delta\tau_1-\Delta\tau_2$ will be described.

Firstly, the quotient $p_2/p_1$ is multiplied by the following expression.

[Math. 13]

$$e^{i\omega\frac{\Delta\tau_1+\Delta\tau_2}{2}} \quad (13)$$

In accordance with this, a real part and an imaginary part are calculated. The real part is given by the following expression.

[Math. 14]

$$\mathrm{Re}\left(\frac{p_2}{p_1}e^{i\omega\frac{\Delta\tau_1+\Delta\tau_2}{2}}\right) = \quad (14)$$

$$\cos\left(\omega\frac{\Delta\tau_1-\Delta\tau_2}{2}\right) + \frac{2a_1 a_2 \sin\left(\omega\frac{\Delta\tau_1-\Delta\tau_2}{2}\right)\sin\omega\Delta\tau_{12}}{a_1^2+a_2^2+2a_1 a_2 \cos(\omega\Delta\tau_{12})}$$

The imaginary part is given by the following expression.

[Math. 15]

$$\operatorname{Im}\left(\frac{p_2}{p_1}e^{i\omega\frac{\Delta\tau_1+\Delta\tau_2}{2}}\right) = \frac{-(a_1^2 - a_2^2)\sin\left(\omega\frac{\Delta\tau_1 - \Delta\tau_2}{2}\right)}{a_1^2 + a_2^2 + 2a_1a_2\cos(\omega\Delta\tau_{12})} \quad (15)$$

According to Expressions (14) and (15),

[Math. 16]

$$\frac{p_2}{p_1}e^{i\omega\frac{\Delta\tau_1+\Delta\tau_2}{2}} \quad (16)$$

it can be understood that Expressions (16) draws a locus of the circumference of a circle on the complex plane while the angular frequency ω is changed. The locus of Expression (16) when the angular frequency ω is changed is obtained by rotating the locus of the quotient $p_2/p_1$ by the same angle as the angle of the inclination of the approximation straight line expressed as Expression (9) in a direction opposite to the inclination of the approximation straight line.

According to Expression (14), the real number component of a center coordinate of the circumference of the circle after rotation is given by the following expression.

[Math. 17]

$$\cos\left(\omega\frac{\Delta\tau_1 - \Delta\tau_2}{2}\right) \quad (17)$$

Thus, when the real number component of a center coordinate of the circumference of the circle after rotation is determined, $\Delta\tau_1 - \Delta\tau_2$ can be determined in accordance with Expression (17). When coordinates of at least three points on the circumference of a circle are determined, a center coordinate of the circumference of the circle can be determined. Since in the first embodiment three kinds of radio waves with different frequencies are received, coordinates of three points on the circumference of a circle can be determined by using the computational result of the quotient $p_2/p_1$. When $\Delta\tau_1 - \Delta\tau_2$ is calculated in accordance with Expression (17), the average angular frequency ω of the three kinds of radio waves can be used.

Next, in step ST6 in FIG. 2, $\Delta\tau_1$ and $\Delta\tau_2$ are determined. $\Delta\tau_1$ and $\Delta\tau_2$ can be determined in accordance with $\Delta\tau_1 + \Delta\tau_2$ determined in step ST3 and $\Delta\tau_1 - \Delta\tau_2$ determined in step ST5.

Next, in step ST7 in FIG. 2, the arrival directions $\theta_1$ and $\theta_2$ of radio wave (FIG. 3A) are determined in accordance with the arrival time differences $\Delta\tau_1$ and $\Delta\tau_2$ determined in step ST6. The arrival directions $\theta_1$ and $\theta_2$ are given by the following expressions:

[Math. 18]

$$D\sin\theta_1 = c\Delta\tau_1$$

$$D\sin\theta_2 = c\Delta\tau_2 \quad (18)$$

where D is the distance between the two antennas 11 (FIG. 3A), and c is the light speed.

When Expression (18) is calculated, the arrival directions $\theta_1$ and $\theta_2$ are still not specified with respect to plus and minus. Furthermore, $\Delta\tau_1$ and $\Delta\tau_2$ may be replaced with each other, it is impossible to determine which of the arrival directions $\theta_1$ and $\theta_2$ is the arrival direction of a direct wave. To uniquely determine the arrival direction $\theta_1$ of a direct wave, it is desired to previously check the movement range of the actual transmission device 20 (FIG. 1), the positions of objects reflecting radio waves, and the like by employing a different method. By using these kinds of information, it is possible to uniquely determine the arrival direction $\theta_1$ of a direct wave.

Next, with reference to FIGS. 4 and 6, a simulation of determining the arrival direction by using the method of estimating the arrival direction of radio wave with the use of the radio wave arrival direction estimation apparatus 10 according to the first embodiment will be described.

Figure 4:
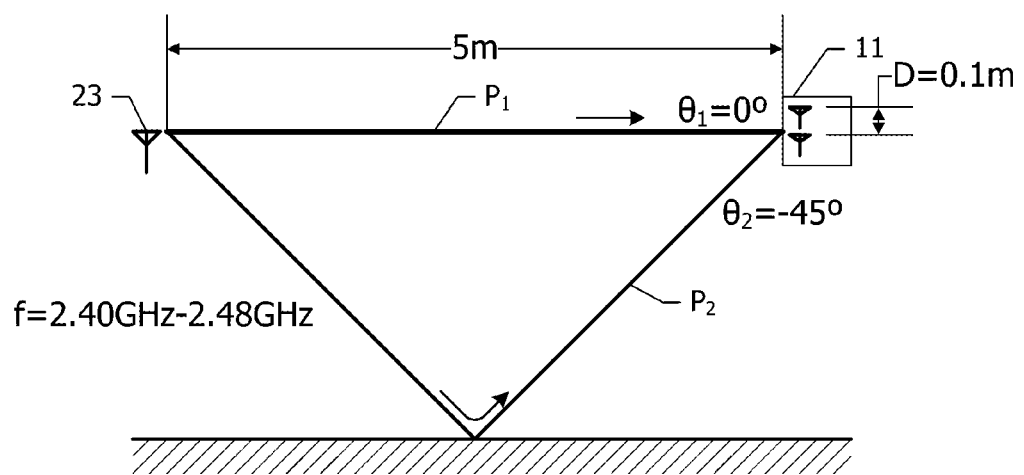
FIG. 4 schematically illustrates a radio transmitter-receiver system with which the simulation has been carried out.

FIG. 4 schematically illustrates a radio transmitter-receiver system with which the simulation has been carried out. The distance between the transmit antenna 23 to the two receive antennas 11 is 5 m. The arrival direction $\theta_1$ of a direct wave propagating along the first path P1 is 0°. The arrival direction $\theta_2$ of a reflected wave propagating along the second path P2 is −45°. The distance D between the two receive antennas 11 is 0.1 m. The frequency of radio wave used to estimate the arrival direction of radio wave was changed within a range of 2.40 to 2.48 GHz in increments of 2 MHz.

Figure 5A:
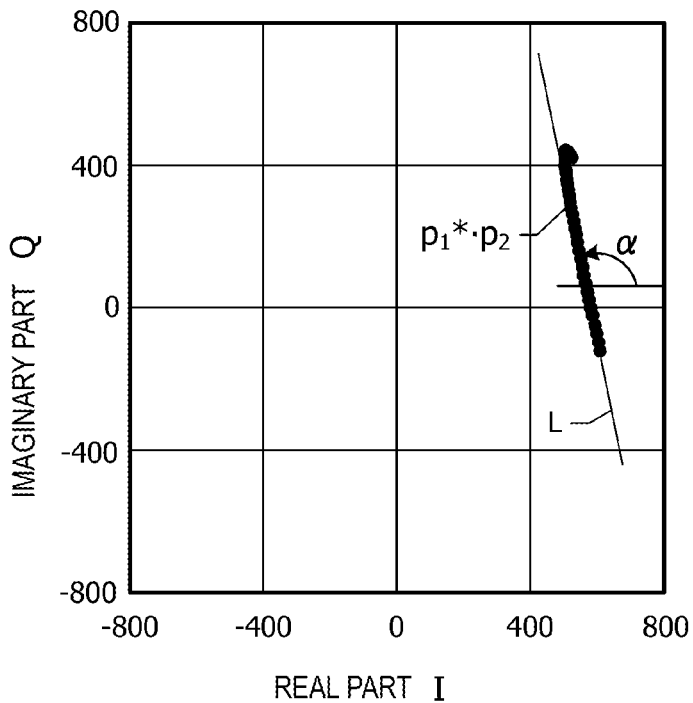
FIG. 5A is a graph illustrating the locus of the product $p_1^* \cdot p_2$ on a complex plane when the frequency is changed.

FIG. 5A is a graph illustrating the locus of the product $p_2^* \cdot p_1$ on a complex plane when the frequency is changed. It can be seen that the locus can be approximated by a substantially straight line L. The inclination angle of the straight line L with respect to the real axis is indicated by α.

Figure 5B:
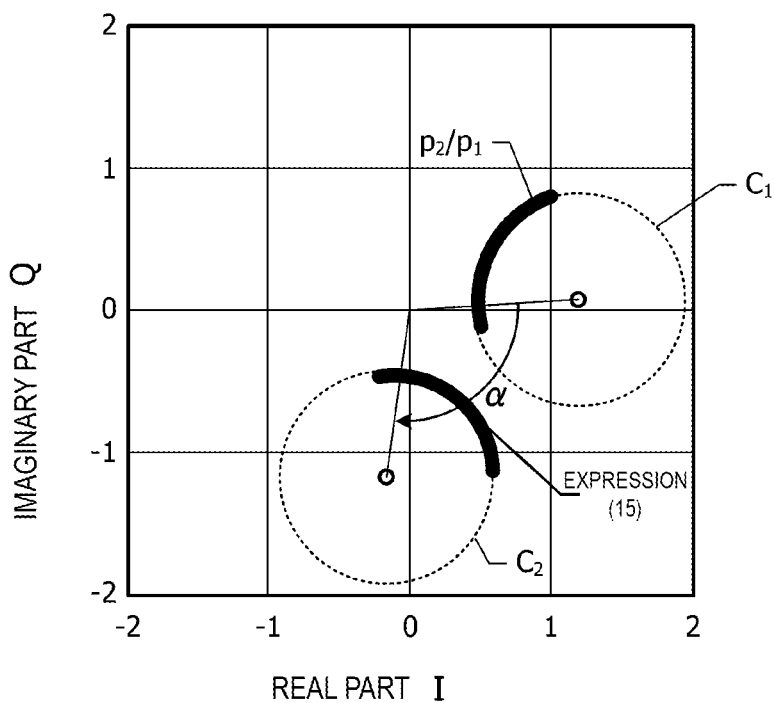
FIG. 5B is a graph illustrating the locus of the quotient $p_2/p_1$ on a complex plane when the frequency is changed.

FIG. 5B is a graph illustrating the locus of the quotient $p_2/p_1$ on a complex plane when the frequency is changed. The locus is a part of a circle circumference $C_1$. When a circle circumference $C_2$ is formed by rotating the circle circumference $C_1$ by the inclination angle α in a direction opposite to the inclination of the approximation straight line L illustrated in FIG. 5A, a part of the circle circumference $C_2$ corresponds to the locus of Expression (16). The real part of a center coordinate of the circle circumference $C_2$ corresponds to Expression (17).

In accordance with the inclination angle α of the approximation straight line L and the real part of the center coordinate of the circle circumference $C_2$, $\Delta\tau_1$ and $\Delta\tau_2$ can be calculated. In accordance with $\Delta\tau_1$, $\Delta\tau_2$, and the distance D between the antennas 11, the arrival directions $\theta_1$ and $\theta_2$ of radio wave can be determined.

Figures 6, 7:
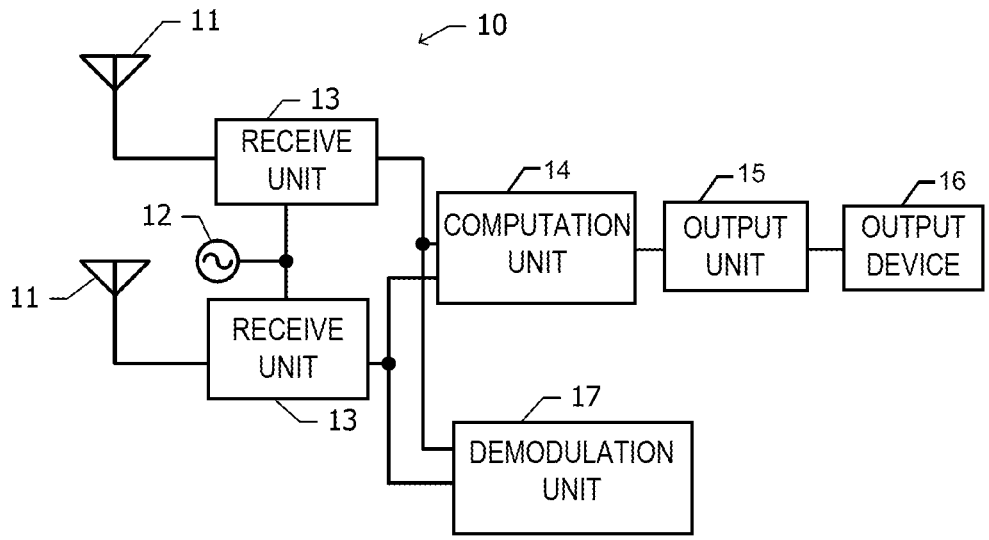
FIG. 6 is a table indicating a comparison between true values predetermined for a radio transmitter-receiver system (FIG. 4) targeted for simulation and values determined by the simulation.
FIG. 7 is a block diagram of a radio wave arrival direction estimation apparatus according to a second embodiment.

FIG. 6 is a table indicating a comparison between true values predetermined for the radio transmitter-receiver system (FIG. 4) targeted for simulation and values determined by the simulation. The difference between the true value and the simulation value of the arrival direction $\theta_1$ of a direct wave propagating along the first path $P_1$ 0.2°. The difference between the true value and the simulation value of the arrival direction $\theta_2$ of a reflected wave propagating along the second path $P_2$ is 1.8°. As a result, it can be understood that using the radio wave arrival direction estimation apparatus 10 according to the first embodiment enables sufficiently accurate estimation of the arrival direction.

Although in the simulation described above the frequency was changed within the range of 2.40 to 2.48 GHz in increments of 2 MHz, the actual measurement only needs to use three kinds of radio waves with different frequencies.

Next, excellent effects of the first embodiment will be described. With the first embodiment, the arrival direction of radio wave can be estimated in a multipath environment by using the two fixed receive antennas 11 (FIG. 1). As such, the first embodiment does not need more than three receive antennas and also does not need any movable mechanical mechanism, such as a rotation plate. Thus, the arrival direction of radio wave can be estimated by using an existing radio system. Moreover, the computational complexity of determining the arrival direction of radio wave is reduced as compared to known methods, and as a result, it is possible to decrease costs and power consumption of hardware of the computation unit 14 (FIG. 1).

In the first embodiment, it is assumed that when three kinds of radio waves with different frequencies are represented by using the value of the product $p_1^* \cdot p_2$ and plotted as three points on a complex plane, the three points are positioned on a single approximation straight line (the approximation straight line L in FIG. 5A). To achieve this approximation, the fractional bandwidth of three kinds of radio waves can be equal to or less than 5%. Here, the fractional bandwidth is a value calculated by dividing the difference (band width) between the highest frequency and the lowest frequency of three kinds of radio waves by the center frequency. For example, the frequency of radio wave used in the simulation described with reference to FIGS. 4 to 6 ranges from 2.40 to 2.48 GHz. When the arrival direction of radio wave is estimated by using three kinds of radio waves at 2.40, 2.44, and 2.48 GHz frequencies within this frequency range, the band width is 0.08 GHz and the center frequency is 2.44 GHz. In this case, the fractional bandwidth is approximately 3.3%.

Conversely, if the fractional bandwidth is excessively small, three points corresponding to three kinds of radio waves on a complex plane are positioned close to each other, and as a result, errors are likely to occur when the inclination of the approximation straight line or the center coordinate of the circumference of a circle is determined. To achieve highly accurate calculation of the inclination of the approximation straight line and the center coordinate of the circumference of a circle, the fractional bandwidth can be 3% or greater.

Microwaves or millimeter waves can be used as the three kinds of radio waves with different frequencies used in the first embodiment. When microwaves or millimeter waves are used, the distance D between the two antennas 11 (FIGS. 1 and 3A) can be set in a range of several mm to several cm. As a result, the radio wave arrival direction estimation apparatus 10 can be easily fabricated, and additionally, the accuracy of estimation of the arrival direction of radio wave can be increased. Moreover, the 2.4 GHz ISM band can be used, for which the registration or license acquisition as a radio station is unnecessary or easy.

Next, various modifications to the first embodiment will be described. In the first embodiment, as described above, the distance D between the two antennas 11 can be λ/4 or shorter to uniquely determine $\Delta\tau_1 + \Delta\tau_2$ in step ST3 (FIG. 2). In the case in which the movement range of the transmission device 20 is limited and the arrival direction of radio wave is also limited within a particular range of angle, when the distance D between the two antennas 11 is λ/4 or longer, $\Delta\tau_1 + \Delta\tau_2$ may be uniquely determined in some cases. For example, when the receive antennas 11 are installed at a corner of walls perpendicular to each other in a building and the arrival direction of radio wave from the transmission device 20 in the building is estimated, the arrival direction of radio wave is limited in a range of an angle 90° with respect to the horizontal direction.

In the first embodiment, the arrival direction of radio wave is determined in accordance with the product $p_1^* \cdot p_2$, which is the product of the complex conjugate $p_1^*$ of the complex signal $p_1$ and the complex signal $p_2$, and the quotient $p_2/p_1$, which is calculated by dividing the complex signal $p_2$ by the complex signal $p_1$. As another method, the arrival direction of radio wave may be calculated in accordance with the product $p_1^* \cdot p_2$ and the quotient $p_1/p_2$ that is calculated by replacing the denominator and the numerator with each other.

Additionally, $\Delta\tau_1$ and $\Delta\tau_2$ may be determined by calculating simultaneous equations of Expression (5) and Expression (6). In accordance with Expression (5) and Expression (6), simultaneous equations with six variables and different angular frequencies ω can be obtained. The six unknowns are the amplitudes $a_1$ and $a_2$, and the times $\tau_{11}$, $\tau_{12}$, $\tau_{21}$, and $\tau_{22}$, each of which corresponds to a phase with reference to the local clock signal. By computing the simultaneous equations with the six variables, the arrival time differences $\Delta\tau_1$ and $\Delta\tau_2$ can be determined.

While in the first embodiment the receive units 13 are respectively provided for the two antennas 11, the two receive units 13 are not necessarily provided and a single receive unit 13 may be shared by the two antennas 11. For example, the single receive unit 13 can perform receive processing from the two antennas 11 in a time-division manner.

As described above, the arrival direction of radio wave can be estimated by using the radio wave arrival direction estimation apparatus 10 according to the first embodiment. By using a plurality of radio wave arrival direction estimation apparatuses 10, the transmission device 20 (FIG. 1) can be located.

Second Embodiment

Next, the radio wave arrival direction estimation apparatus 10 according to a second embodiment will be described with reference to FIG. 7. Hereinafter, descriptions of configurations common between the radio wave arrival direction estimation apparatus 10 according to the first embodiment and the radio wave arrival direction estimation apparatus 10 according to the second embodiment will not be repeated. In the second embodiment, the transmission device 20 (FIG. 1) and the radio wave arrival direction estimation apparatus 10 communicate with each other in conformity with an existing wireless communication protocol. Examples of the wireless communication protocol include Bluetooth Low Energy (BLE), Wi-Fi, ZigBee (registered trademark).

FIG. 7 is a block diagram of the radio wave arrival direction estimation apparatus 10 according to the second embodiment. The radio wave arrival direction estimation apparatus 10 according to the second embodiment includes a demodulation unit 17. Complex signals are outputted by the two receive units 13 and inputted to the demodulation unit 17. The demodulation unit 17 demodulates the inputted complex signals.

In the second embodiment, a receiver of an existing wireless communication system can also be used as the radio wave arrival direction estimation apparatus. Furthermore, the single device can perform both estimation of the arrival direction of radio wave and data communication. For example, a signal of a BLE advertising channel can be used as a radio wave used to estimate the arrival direction of radio wave. In particular, it is desirable that a field with a predetermined signal pattern of transmit and receive signals be used to estimate the arrival direction of radio wave.

The embodiments described above are mere examples, and as might be expected, the configurations described in the different embodiments may be partially replaced or combined with each other. In particular, almost identical effects and advantages achieved by almost identical configurations in the plurality of embodiments are not mentioned in every embodiment. Moreover, the present disclosure is not limited to the embodiments described above. For example, various modifications, improvements, and combinations would be apparent to those skilled in the art.

REFERENCE SIGNS LIST 10 radio wave arrival direction estimation apparatus
11 antenna
11A first antenna
11B second antenna
12 local oscillator
13 receive unit
14 computation unit
15 output unit
16 output device
17 demodulation unit
20 transmission device
21 local oscillator
22 signal generation unit
23 antenna
$P_1$ first path
$P_2$ second path
$\theta_1$ arrival direction of radio wave propagating along first path
$\theta_2$ arrival direction of radio wave propagating along second path

The invention claimed is:

1. A radio wave arrival direction estimation apparatus comprising:
    a first antenna and a second antenna, each of the first and second antennas being configured to receive a first radio wave, a second radio wave, and a third radio wave, each of the first, second, and third radio waves having different frequencies; and
    a processor configured to determine an arrival direction of the first, second, and third radio waves arriving at each of the first and second antennas,
    wherein each of the first, second, and third radio waves propagate along a first path to each of the first antenna and the second antenna, and along a second path to each of the first antenna and the second antenna,
    wherein the first path and the second path are mutually different paths from a single transmit point,
    wherein the processor is configured to, for each of the first, second, and third radio waves received by each of the first and second antennas:
        convert each of the first, second, and third radio waves into two complex signals;
        compute a product of a complex conjugate of the corresponding two complex signals;
        compute a quotient of the corresponding two complex signals; and
        determine the arrival direction based on the corresponding product and the corresponding quotient.

2. The radio wave arrival direction estimation apparatus according to claim 1, wherein the processor is configured to:
    compute an approximation of a straight line by using a first set of three points on a complex plane and a center point of a circumference of a circle passing through a second set of three points on the complex plane; and
    determine the arrival direction of each of the first, second, and third radio waves received by each of the first and second antennas based on an inclination of an approximation of the straight line and the center coordinate of the circumference of the circle,
    wherein each point of the first set of three points corresponds to the product of a respective one of the first, second, and third radio waves, and
    wherein each point of the second set of three points corresponds to the quotient of a respective one of the first, second, and third radio waves.

3. The radio wave arrival direction estimation apparatus according to claim 1, wherein a distance between the first and second antennas is equal to or less than ¼ of a shortest wavelength of the first, second, and third radio waves.

4. The radio wave arrival direction estimation apparatus according to claim 2, wherein a distance between the first and second antennas is equal to or less than ¼ of a shortest wavelength of the first, second, and third radio waves.

5. The radio wave arrival direction estimation apparatus according to claim 1, wherein a fractional bandwidth of each of the first, second, and third radio waves is equal to or less than 5%.

6. The radio wave arrival direction estimation apparatus according to claim 2, wherein a fractional bandwidth of each of the first, second, and third radio waves is equal to or less than 5%.

7. The radio wave arrival direction estimation apparatus according to claim 1, wherein the first, second, and third radio waves are microwaves or millimeter waves.

8. The radio wave arrival direction estimation apparatus according to claim 2, wherein the first, second, and third radio waves are microwaves or millimeter waves.

9. The radio wave arrival direction estimation apparatus according to claim 1, wherein the first, second, and third radio waves conform to a wireless communication protocol.

10. The radio wave arrival direction estimation apparatus according to claim 2, wherein the first, second, and third radio waves conform to a wireless communication protocol.

11. The radio wave arrival direction estimation apparatus according to claim 1, wherein the first, second, and third radio waves are in a 2.4 GHz ISM band.

12. The radio wave arrival direction estimation apparatus according to claim 2, wherein the first, second, and third radio waves are in a 2.4 GHz ISM band.

* * * * *